United States Patent
Bhakta et al.

(10) Patent No.: US 7,689,671 B2
(45) Date of Patent: Mar. 30, 2010

(54) SYSTEM AND METHOD FOR MULTIPLE IP ADDRESSES DURING DOMAIN NAME RESOLUTION

(75) Inventors: Dharmesh N. Bhakta, Austin, TX (US); Juan Francisco Obas, Austin, TX (US); Lakshmi Potluri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 11/684,400

(22) Filed: Mar. 9, 2007

(65) Prior Publication Data

US 2008/0222307 A1    Sep. 11, 2008

(51) Int. Cl.
G06F 15/16 (2006.01)
(52) U.S. Cl. .................. 709/219; 709/223; 709/224; 709/229; 709/238; 709/245
(58) Field of Classification Search .............. 709/219, 709/223, 224, 229, 238, 245
See application file for complete search history.

(56) References Cited

U.S. PATENT DOCUMENTS

| | | | |
|---|---|---|---|
| 6,304,913 B1 | 10/2001 | Rune | 709/241 |
| 6,374,295 B2* | 4/2002 | Farrow et al. | 709/223 |
| 7,003,555 B1* | 2/2006 | Jungck | 709/219 |
| 7,086,061 B1* | 8/2006 | Joshi et al. | 718/105 |
| 2004/0037297 A1 | 2/2004 | Ishida et al. | 370/395.54 |
| 2006/0039352 A1 | 2/2006 | Karstens | 370/352 |
| 2007/0118668 A1* | 5/2007 | McCarthy et al. | 709/238 |
| 2008/0086574 A1* | 4/2008 | Raciborski et al. | 709/245 |
| 2008/0091834 A1* | 4/2008 | Norton | 709/229 |

OTHER PUBLICATIONS

Office action for co-pending U.S. Appl. No. 11/684,389, mailed May 4, 2009, 10 pages.

* cited by examiner

*Primary Examiner*—Jinsong Hu
(74) *Attorney, Agent, or Firm*—Van Leeuwen & Van Leeuwen; Justin M. Dillon

(57) ABSTRACT

A system, method, and program product are provided that access a network resource by sending, from a client computer system, a first domain name resolution request to a DNS server. The first domain name resolution request includes a first domain name and requests multiple IP addresses. The client computer system receives, from the DNS server, a first multiple IP address response that corresponds to the first domain name resolution request, the first multiple IP address response including a IP addresses that each correspond to the first domain name included in the first domain name resolution request. At the client computer system, one of the plurality of IP addresses is selected by a user. The client computer system sends a request to a server corresponding to the selected IP address. The client computer system then receives responsive data from the server and displays the responsive data on a display screen accessible from the client computer system.

21 Claims, 12 Drawing Sheets

SYSTEM AND METHOD FOR MULTIPLE IP ADDRESSES DURING DOMAIN NAME RESOLUTION

BACKGROUND OF THE INVENTION

1. Technical Field

The present invention relates to a system and method that accesses more than one IP address for a given domain name. More particularly, the present invention retrieves multiple IP addresses for a domain name from an enhanced domain name system (DNS) server that manages multiple IP addresses and includes one default address per domain name.

2. Description of the Related Art

Domain name servers are responsible for resolving a domain name to an Internet Protocol (IP) address. When a user enters a Uniform Resource Locator (URL), such as "www.ibm.com", a Domain Name System (DNS) Server is used to look up the IP address of the web site (in this case, the web site for the International Business Machines Corporation). Domain names are highly convenient as they are more "user friendly" than IP addresses that are relatively long, numeric addresses. Because people remember words and phrases far better than numeric addresses, domain names greatly aid the user in locating a particular web site. A client, such as a personal computer running "browser" software connects to a large computer network, such as the Internet. When the user enters a URL (that includes a domain name) into the web browser, a DNS server is used to look up the IP address of the URL and return the IP address so the IP address can be used to access the network resource (e.g., the IBM web site).

There are numerous DNS servers that provide domain name resolution on a large computer network such as the Internet. A particular client will often store a few DNS server addresses (e.g., a primary and a secondary DNS server). These DNS server address references determine which DNS servers a particular client will use to resolve requests for domain name resources. While DNS makes the task of locating network resources easier, the current system is faced with particular challenges.

One challenge facing the current DNS is that, by rule, a DNS server can only include one IP address for any given URL. This is a challenge because, while the DNS is generally a large distributed database, the IP addresses for a given URL maintained by one DNS server is not necessarily the same IP address that is maintained by another DNS server. There are many reasons why the IP addresses for a given URL differ from one DNS server to the next. Sometimes the IP addresses are purposefully changed based upon laws, language differences, and the like. Because the IP addresses might be different, providing services, such as customer help desk operations, is increasingly challenging. A help desk employee using one DNS server may access a different IP address (and thus different content) from a customer that is using a different DNS server.

Another challenge facing the current DNS is in the area of redirecting users to different web sites based upon the user's needs. For example, some businesses have various business units and/or business partners that each has their own network presence. However, if the user cannot remember the names (e.g., domain names) of the individual business unit/partner that he or she wishes to visit, the user often needs to visit the primary business network site first and look through a list of "links" to other business units/partners. This causes the primary site to receive traffic that could otherwise be directed away from the primary site. This challenge is exacerbated if the primary site is experiencing problems or is otherwise unavailable as the user will be unable to easily access the site of the business unit/partner.

SUMMARY

It has been discovered that the aforementioned challenges are resolved using a system, method and computer program product that access a network resource by sending, from a client computer system, a first domain name resolution request to a DNS server. The first domain name resolution request includes a first domain name and requests multiple IP addresses. The client computer system receives, from the DNS server, a first multiple IP address response that corresponds to the first domain name resolution request, the first multiple IP address response including a IP addresses that each correspond to the first domain name included in the first domain name resolution request. At the client computer system, one of the plurality of IP addresses is selected by a user. The client computer system sends a request to a server corresponding to the selected IP address. The client computer system then receives responsive data from the server and displays the responsive data on a display screen accessible from the client computer system.

In one embodiment, the IP address response includes one default IP address. In an alternate embodiment, a second domain name resolution request is sent by the client to the DNS server, the second domain name resolution request requesting a single IP address and including a second domain name. The client then receives, from the DNS server, a second default IP address that corresponds to the second domain name. The client computer system then automatically requests data from a second server that corresponds to the second IP address.

In one embodiment, a second domain name resolution request is sent by the client to the DNS server. The second domain name resolution request requests multiple IP addresses and includes a second domain name. In response, the DNS server sends a second multiple IP address response that corresponds to the second domain name resolution request. The second multiple IP address response including a single IP address that corresponds to the second domain name included in the second domain name resolution request as only one IP address was found for the second domain name. The client computer, after receiving the IP address, automatically request data from a second server that corresponds to the single IP address in response to receiving the single IP address at the client computer system.

In another embodiment, the first multiple IP address response includes multiple descriptive texts that correspond to the multiple IP addresses included in the first multiple IP address response. In this embodiment, prior to the selecting, the descriptive texts corresponding to the plurality of IP addresses are displayed to the user. In this manner, the user's selection is based upon the displayed descriptive texts.

In a further embodiment, one or more IP addresses included in the first multiple IP address response do not have corresponding descriptive texts. Prior to displaying the descriptive texts, the client computer system accesses each network resource that corresponds with each of the IP addresses that does not have corresponding descriptive texts, gathers descriptive text for each of the accessed network resources, and includes the gathered descriptive texts in the display of descriptive texts.

In one embodiment, the DNS server receives the multiple IP addresses corresponding to the first domain name from a domain name repository. The DNS server and the domain name repository are connected using a computer network. The DNS server receives IP addresses corresponding to domain names maintained by the DNS server from a domain name repository. The domain name repository is gathered by a DNS crawler that searches through multiple DNS tables to find multiple IP addresses that pertain to a given domain name.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
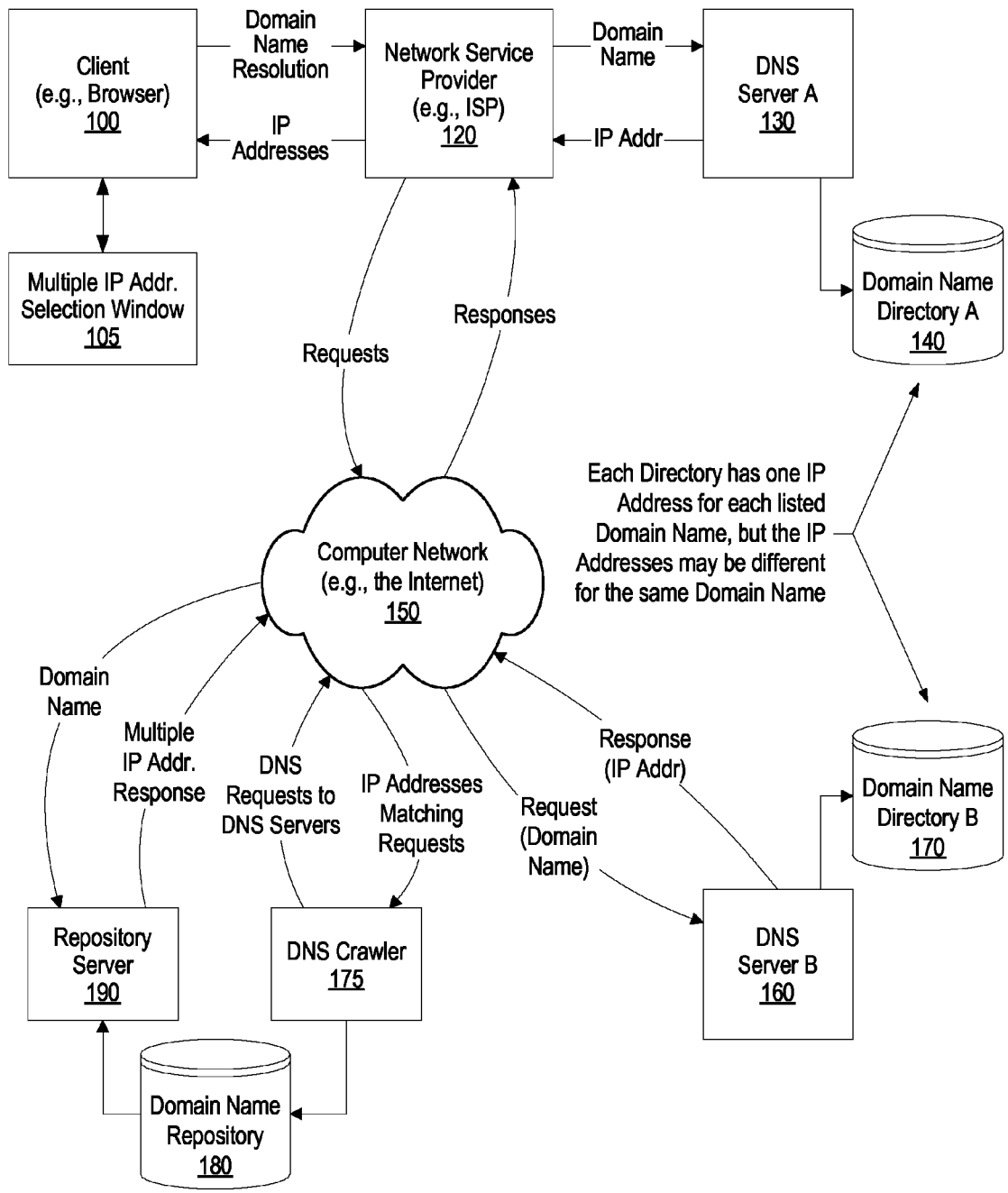
FIG. 1 is an embodiment of a system diagram showing components used to provide a client with multiple IP addresses corresponding to a single domain name.

FIG. 1 is a system diagram showing components used to provide a client with multiple IP addresses corresponding to a single domain name. Client computer system 100 sends domain name resolution requests in order to resolve IP addresses for a given domain name. Network service provider 120 provides network connectivity for client computer system 100 allowing client computer system 100 to connect to computer system 150. An example of a client application running on the client computer system is a browser software application. Large organizations may provide network service provider 120, while households and small businesses often use an Internet Service Provider (ISP) to connect to the computer network. One example of a computer network to which the client computer system connects is the Internet.

Client 100 typically identifies a small number of Domain Name Service (DNS) servers from which the client receives IP addresses that correspond to domain names. When client 100 is retrieving a single IP address corresponding to a domain name, then the client's identified (e.g., default) DNS server is accessed. In the example shown in FIG. 1, DNS server A (130) is used to resolve domain names. When DNS Server A 130 receives a domain name, it retrieves the IP address corresponding to the domain name from its directory (Domain Name Directory A 140).

Many DNS servers exist in a large computer network such as the Internet. For a variety of reasons, the IP address that corresponds to a domain name may be different from one DNS server to the next. In FIG. 1, DNS Server B (160) is shown with corresponding Domain Name Directory B (170). The IP address listed for a given domain name may be one IP address in Directory A (140) and a different IP address in Directory B (170). In other words, a client computer system using DNS Server A (130) would be directed to a different network resource (e.g., web page, etc.) than another client computer system that uses DNS Server B (160). If client computer system 100 is a help desk computer being used by a help desk technician that is attempting to help a customer that is using DNS Server B, the problems or questions posed by the customer may not appear to the help desk technician because the client computer system is accessing a different IP address, and thus a different network resource (such as a web page), than is being accessed by the customer.

In one embodiment, DNS Crawler 175 aids in resolving this discrepancy by retrieving many IP addresses from many DNS servers that correspond to the same domain name. The unique IP addresses that correspond to the same domain name are gathered by DNS Crawler 175 and stored in Domain Name Repository 180.

Returning to client computer system 100, if the client wishes to retrieve multiple IP address for a given domain name, a domain name resolution request is sent from client computer system identifying the domain name and indicating that multiple IP addresses are requested, if available. Either network service provider 120 or the client's DNS server (e.g., DNS Server A 130), forwards the request to repository server 190. The repository server accesses Domain Name Repository 180 and retrieves all of the IP addresses that have been found (by DNS Crawler 175) to correspond with the requested domain name. This multiple IP address response is sent by repository server 190 back to the client computer system. The multiple IP address response can include information in addition to the multiple IP addresses. The additional information can include the DNS server IP address where the IP address was found (e.g., the IP address of DNS Server A 130 or B 160) by DNS Crawler 175, and descriptive text that was retrieved from the network resource (e.g., web site) at the given IP address.

Selection dialog 105 is displayed at the client computer system detailing the multiple IP addresses that were found to correspond to the requested domain name. In one embodiment, the user of client computer system 100 has the option of changing the default DNS server IP address used by client computer system 100 to be the DNS server IP address that provided the IP address selected by the user. In other words, if the user selected an IP address displayed in window 105 that was provided by DNS server B 160, then client computer system 100's default DNS server IP address would be changed to point to DNS Server B 160 rather than DNS Server A 130.

Figure 2:
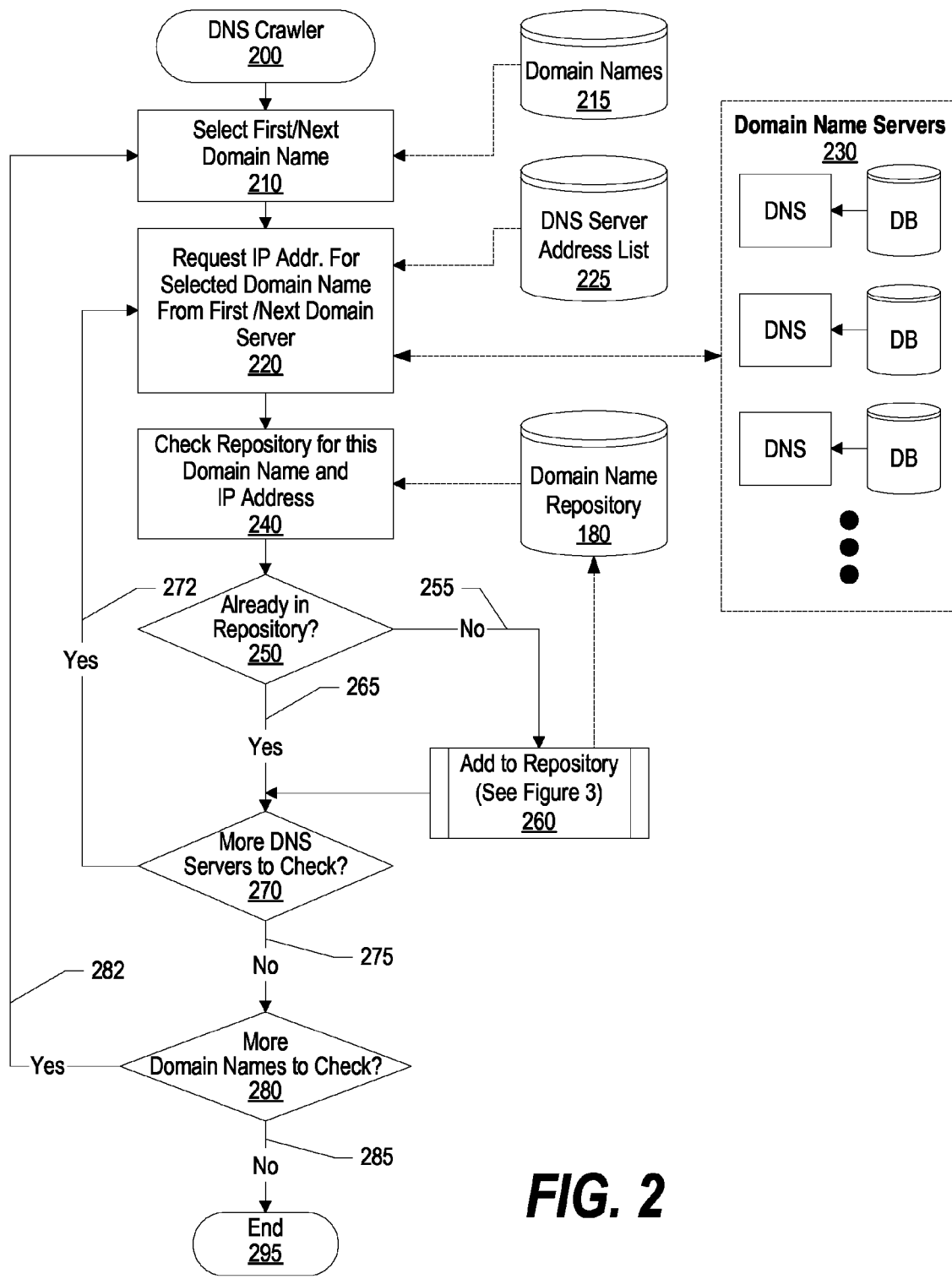
FIG. 2 is an embodiment of a flowchart showing the steps taken by a DNS crawler application that gathers one or more IP addresses that correspond to single domain names.

FIG. 2 is a flowchart showing the steps taken by a DNS crawler application that gathers one or more IP addresses that correspond to single domain names. In FIG. 2, the processing performed by the DNS Crawler (e.g., DNS Crawler 175 shown in FIG. 1) commences at 200. At step 210, the first domain name is selected from domain names data store 215. The domain names stored in domain names data store 215 is related to the scope of service needed by clients that use the resulting Domain Name Repository 180. For example, if an organization is utilizing the DNS Crawler to identify IP addresses that correspond to the organization's domain names throughout the computer network (e.g., throughout the Internet), then the domain names in which the organization is interested would be stored in domain names data store 215. On the other hand, if resulting Domain Name Repository 180 is intended for use by a wide variety of clients with differing needs, then a vast number of domain names would be stored in domain name data store 215. The various domain names could be gathered from various DNS servers or from search engines that track the domain names that are requested by users of the search engine.

At step 220, the DNS crawler retrieves a first DNS server address from DNS server address list 225 and receives the IP address for the selected domain name from the selected DNS server. The DNS servers listed in DNS server address list 225 may include any number of DNS servers. It may be decided to include only a single DNS server from a group of DNS servers that are known to be relatively equivalent in order to reduce the number of DNS servers that are searched. Moreover, DNS servers may be included in DNS server address list 225 based on the location of the server (e.g., the country where the server is hosted). In this manner, DNS servers with different IP addresses due to nationality or legal requirements of various countries would be included in DNS server list 225.

At step 240, Domain Name Repository 180 is checked for the selected domain name and the IP address that was received from the selected DNS server. A determination is made as to whether the received IP address is already in Domain Name Repository 180 as corresponding to this domain name (decision 250). If this IP address is not already in Domain Name Repository 180 as corresponding to this domain name, then decision 250 branches to "no" branch 255 whereupon, at predefined process 260, Domain Name Repository 180 is updated (see FIG. 3 and corresponding text for processing details regarding the updates made to Domain Name Repository 180). On the other hand, if the received IP address is already in Domain Name Repository 180 as corresponding to the selected domain name, then decision 250 branches to "yes" branch 265 bypassing predefined process 260.

A determination is made as to whether there are more DNS servers to check for the selected domain name (decision 270). If there are more DNS servers to check, decision 270 branches to "yes" branch 272 which loops back to select the next DNS server from list 225 and receive and process the IP address from the next selected DNS server. This looping continues until there are no more DNS servers to check, at which point decision 270 branches to "no" branch 275.

After cycling through the DNS servers, another determination is made as to whether there are more domain names in domain name data store 215 to process (decision 280). If there are additional domain names to check, then decision 280 branches to "yes" branch 282 which loops back to select the next domain name from domain name data store 215 and gather IP addresses that correspond to the newly selected domain name. This looping continues until there are no more domain names to process, at which point decision 280 branches to "no" branch 285 and DNS Crawler processing ends at 295.

Figure 3:
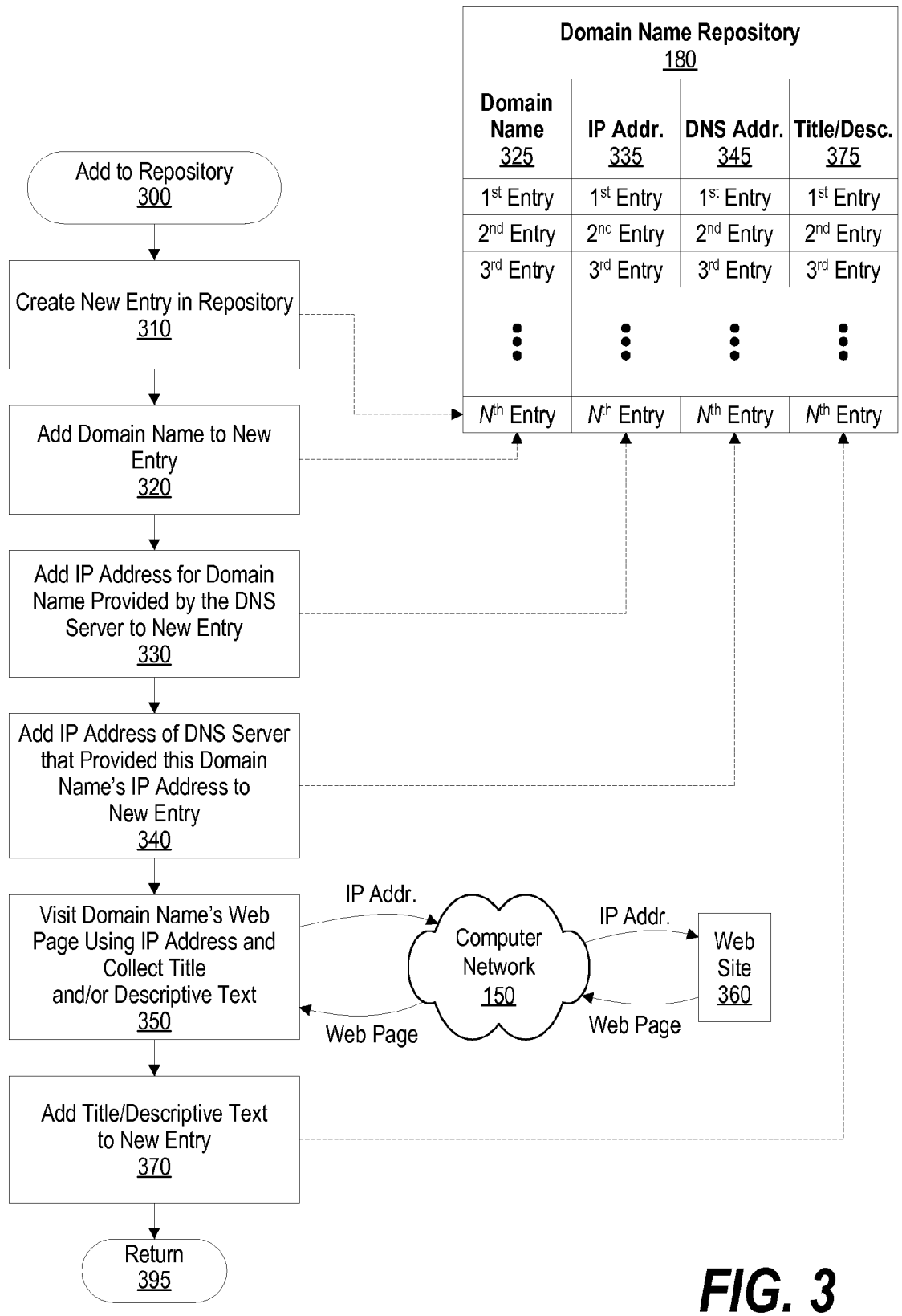
FIG. 3 is an embodiment of a flowchart showing details of the data gathered by the DNS crawler and stored in the domain name repository.

FIG. 3 is a flowchart showing details of the data gathered by the DNS crawler and stored in the domain name repository. This procedure is called by predefined process step 260 shown in FIG. 2. FIG. 3 processing commences at 300 whereupon, at step 310, a new entry is created in Domain Name Repository 180. As shown, Domain Name Repository 180 includes four fields. These fields include domain name field 325 which is used to store the domain name (e.g., ibm.com). The fields also include IP address field 335 which is used to store the IP address where the domain name is referenced in one of the DNS tables (DNS directories) that is being maintained by one of the DNS servers. The fields in Domain Name Repository 180 also include DNS IP address field 345 which is used to store the IP address of the DNS server where this IP address for the domain name was found. Finally, Domain Name Repository 180 includes descriptive text field 375 which is used to store descriptive text corresponding to this particular IP address where the domain name was found. In one embodiment, the descriptive text stored in descriptive text field 375 is gathered by accessing the network resource (e.g., web site) corresponding to the IP address. This descriptive text is useful for end users when selecting which IP address to access.

For example, assume a domain name such as xyz.com has at least two different IP addresses, one in China with a Chinese language web page, and one in the United States with an English language web page. The domain name field for these two IP addresses would be the same (xyz.com), the IP addresses would be two different numbers, and the DNS server IP addresses would also be different (e.g., one being a U.S. DNS server and one being a Chinese DNS server). Finally, the descriptive text gathered from web pages addressed by these two IP addresses would be different—one would be English text and the other would be Chinese text. When presented to a user requesting IP addresses corresponding to xyz.com, the domain names would not provide further useful information because the user already knew that xyz.com was the domain name that was being searched. Further, while different from each other, the IP address and DNS server IP address information are in numeric format and therefore somewhat difficult for a user to distinguish between. However, the descriptive text, when displayed to the user, would readily distinguish between the Chinese version of the xyz.com website and the English version of the site because one descriptive text would appear in English while the other would appear in Chinese. In one embodiment, the DNS crawler gathers the descriptive text as shown in step 350. However, if it is expected that Domain Name Repository 180 will be quite large, the system can refrain from gathering descriptive text at step 350 and can instead gather descriptive text when the domain name is actually requested by a user.

At step 320, the domain name is added to the new entry that was created in Domain Name Repository 180 (e.g., adding "xyz.com"). At step 330, the IP address that was identified by one of the DNS servers as referencing the xyz.com domain name is added to Domain Name Repository 180. At step 340, the IP address of the DNS server where this particular IP address was found is added to Domain Name Repository 180.

At step 350, the network resource, such as a web site, that is referenced by the IP address is visited and the descriptive text is gathered from the network resource and included in descriptive text field 375 of Domain Name Repository 180. As shown, the IP address is used to request data from network resource 360 through computer network 150. The network resource, such as a web page, returns data (e.g., a web page) back to the DNS Crawler application and title or other descriptive text is extracted from the returned data and stored in descriptive text field 375 at step 370.

After data for the newly created entry has been added to Domain Name Repository 180, the processing shown in FIG. 3 ends and processing returns to the calling routine (FIG. 2) at 395.

Figure 4:
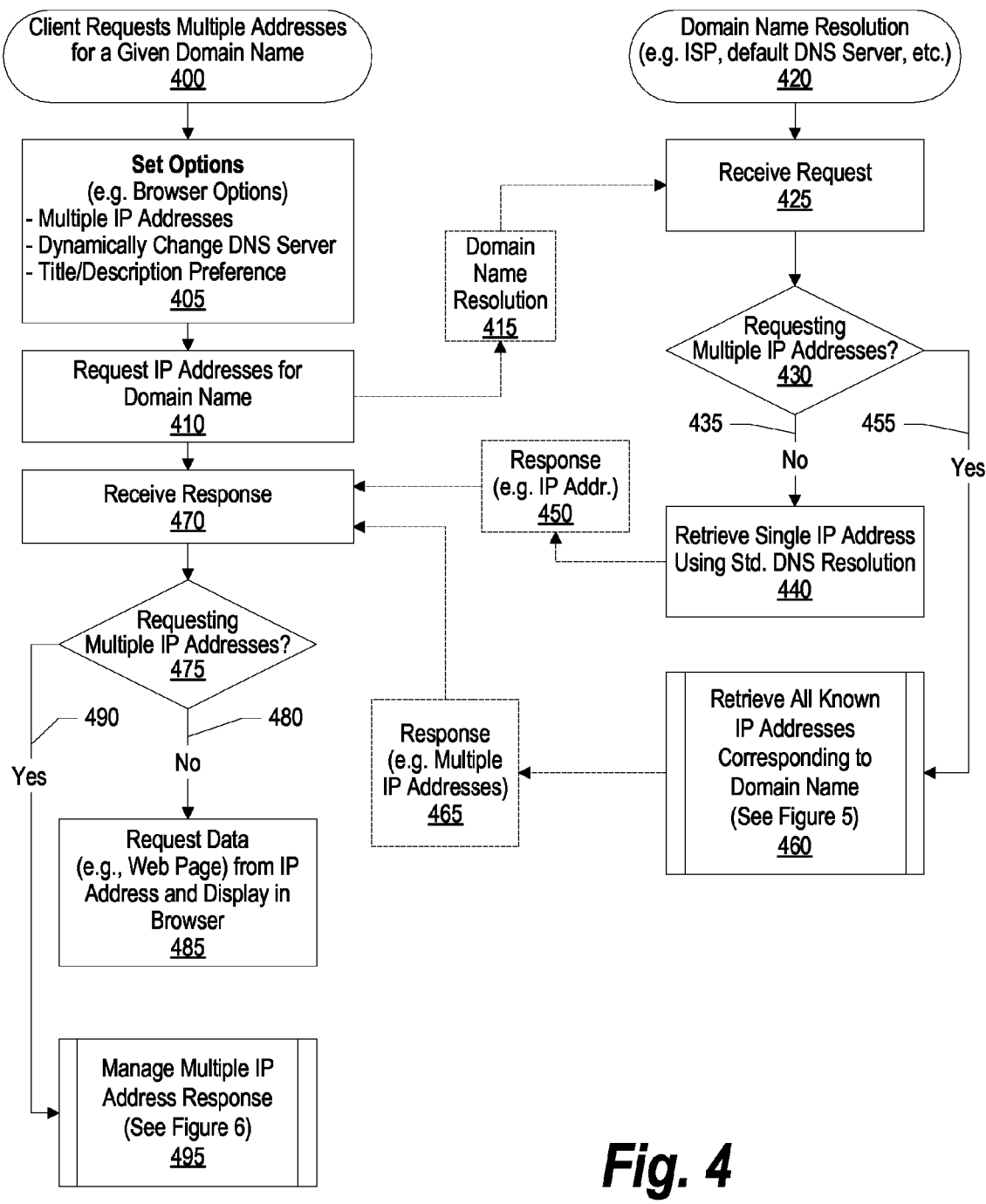
FIG. 4 is an embodiment of a flowchart showing steps taken by a client and a server, with the client requesting resolution of a domain name and the server providing one or more IP addresses that correspond to the requested domain name.

FIG. 4 is a flowchart showing steps taken by a client and a server with the client requesting resolution of a domain name and the server providing one or more IP addresses that correspond to the requested domain name. Client processing commences at 400 whereupon, at step 405, the user sets and stores options at the client computer system. These options are used by one or more software applications, such as a web browser, that run on the client computer system. These options include whether the client wishes to receive multiple IP addresses for a given domain name; whether the system should dynamically change the client's default DNS server address to correspond with a multiple IP address selection, and whether the client wants to have descriptive text information displayed even if such information is not supplied by the server that performs the domain name resolution.

At step 410, after indicating that multiple IP addresses are desired, the client enters a domain name into a software application, such as the browser, and sends the requested domain name to the server that is performing domain name resolution (e.g., a default DNS server, etc.) for the client. Domain name resolution request 415 is transmitted through a computer network, such as the Internet, to the default server.

Domain Name Resolution Server processing commences at 420 whereupon, at step 425, the server receives a request from one of its clients. A determination is made as to whether the client is requesting multiple IP addresses that correspond to a domain name that was provided in the client's request (decision 430). If the client is not requesting multiple IP addresses that correspond to the domain name, then decision 430 branches to "no" branch 435 whereupon, at step 440, a single IP address is retrieved using standard DNS resolution (i.e., using the domain name directory maintained by this particular domain name server without regard to IP addresses that may be maintained for this domain name by other DNS servers). This single IP address (or error if the domain name was not found) is returned to the client as response packet 450. On the other hand, if multiple IP addresses are being requested for the domain name, then decision 430 branches to "yes" branch 455 whereupon, at predefined process 460, all known IP addresses that correspond to this domain name are retrieved and returned to the client in multiple IP address response 465 (see FIG. 5 and corresponding text for processing details involved in retrieving all such known IP addresses). As will be explained in the description of FIG. 5, response packet 465 includes other information, such as the DNS server IP addresses and descriptive text information, in addition to the actual IP addresses.

Returning to client processing, at step 470, the client receives a response from the client's default Domain Name Resolution server. A determination is then made as to whether the client was requesting multiple IP addresses (decision 475). If multiple IP addresses were not being requested, then decision 475 branches to "no" branch 480 whereupon, at step 485, the client automatically uses the returned IP address to request data from the network resource referenced by the returned IP address, such as a web page from a web server that is referenced by the returned IP address. On the other hand, if the client was requesting multiple IP addresses, then decision 475 branches to "yes" branch 490 whereupon, at predefined process 495, the information corresponding to the multiple IP addresses is displayed to the user and the system handles the multiple IP address response.

Figure 5:
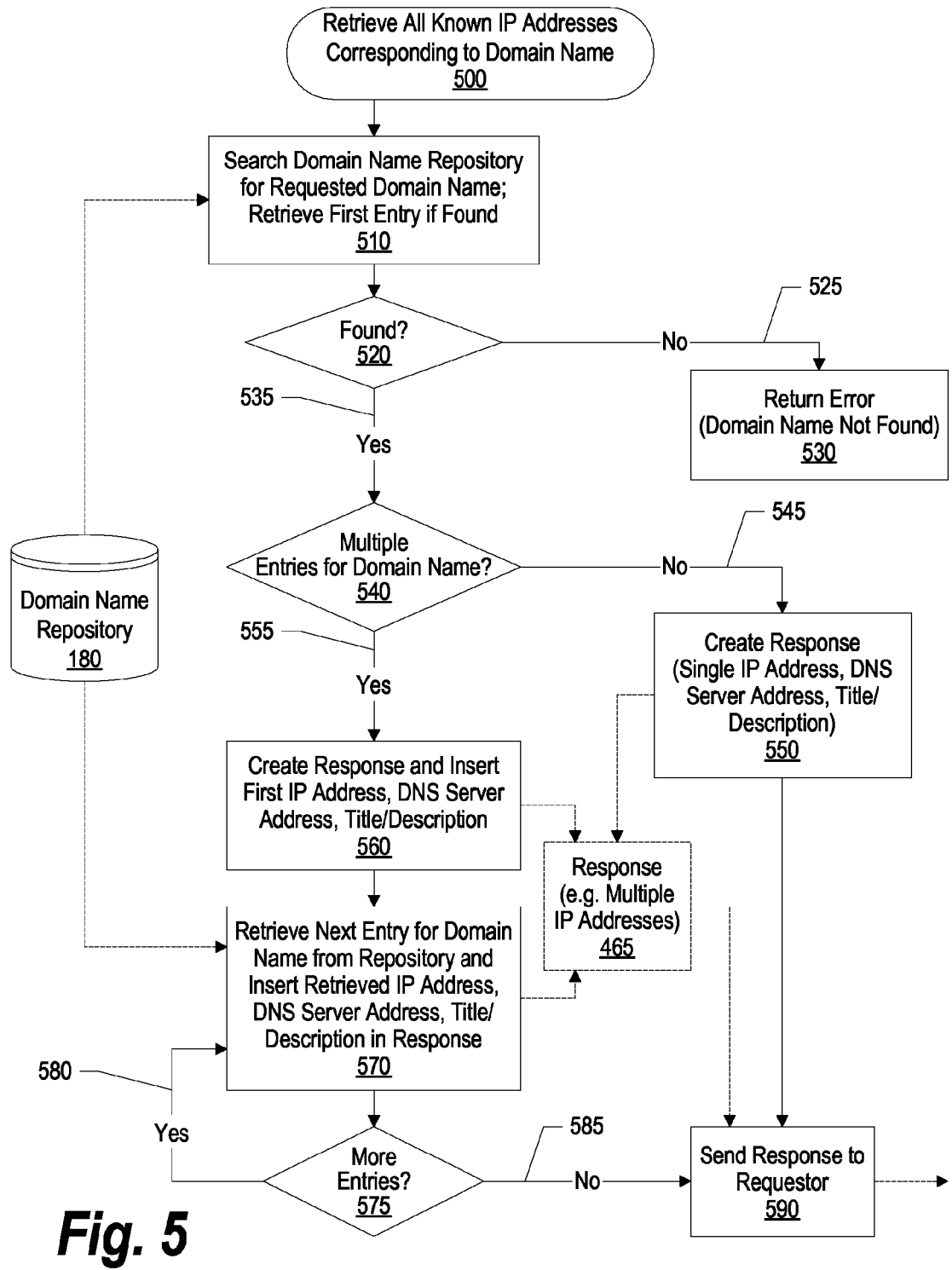
FIG. 5 is an embodiment of a flowchart showing details of the steps taken by the server in FIG. 4 to retrieve all known IP addresses that correspond to the requested domain name.

FIG. 5 is a flowchart showing details of the steps taken by the server in FIG. 4 to retrieve all known IP addresses that correspond to the requested domain name. Processing used to retrieve all known IP addresses corresponding to the requested domain name commences at 500 whereupon, at step 510, Domain Name Repository 180 is searched for the first entry of the requested domain name. A determination is made as to whether an entry for the requested domain name was found in Domain Name Repository 180 (decision 520). If no entries for the requested domain name were found, then decision 520 branches to "no" branch 525 whereupon, at step 530, an error is returned to the client indicating that the requested domain name was not found.

On the other hand, if the domain name was found in Domain Name Repository 180, then decision 520 branches to "yes" branch 535 and another decision is made as to whether there are multiple entries for the domain name in Domain Name Repository 180 (decision 540). If there are not multiple entries for the domain name, then decision 540 branches to "no" branch 545 whereupon, at step 550, response packet 465 is created that includes the single IP address that was found for the domain name, the DNS server IP address of the DNS server where the IP address was found, and descriptive text information (if any). Response packet 465 is returned to the client computer system at step 590.

Returning to decision 540, if multiple entries were found for the requested domain name, then decision 540 branches to "yes" branch 555 whereupon, at step 560 response packet 465 is created and the first IP address that was found for the domain name, the DNS server IP address of the DNS server where the first IP address was found, and the descriptive text information (if any) corresponding to the first IP address are inserted in response packet 465. At step 570, the next entry in Domain Name Repository 180 for the requested domain name is retrieved and the data for the next entry (IP address, DNS server IP address, descriptive text) is inserted in response packet 465. A determination is made as to whether there are more entries in Domain Name Repository 180 corresponding to the requested domain name (decision 575). If there are more entries to retrieve from Domain Name Repository 180 for the requested domain name, then decision 575 branches to "yes" branch 580 which loops back to retrieve the next entry from Domain Name Repository 180 and insert the retrieved data into response packet 465. This looping continues until all entries from Domain Name Repository 180 have been retrieved that reference the requested domain name, at which point decision 575 branches to "no" branch 585 whereupon response packet 465 is returned to the client computer system at step 590.

Figure 6:
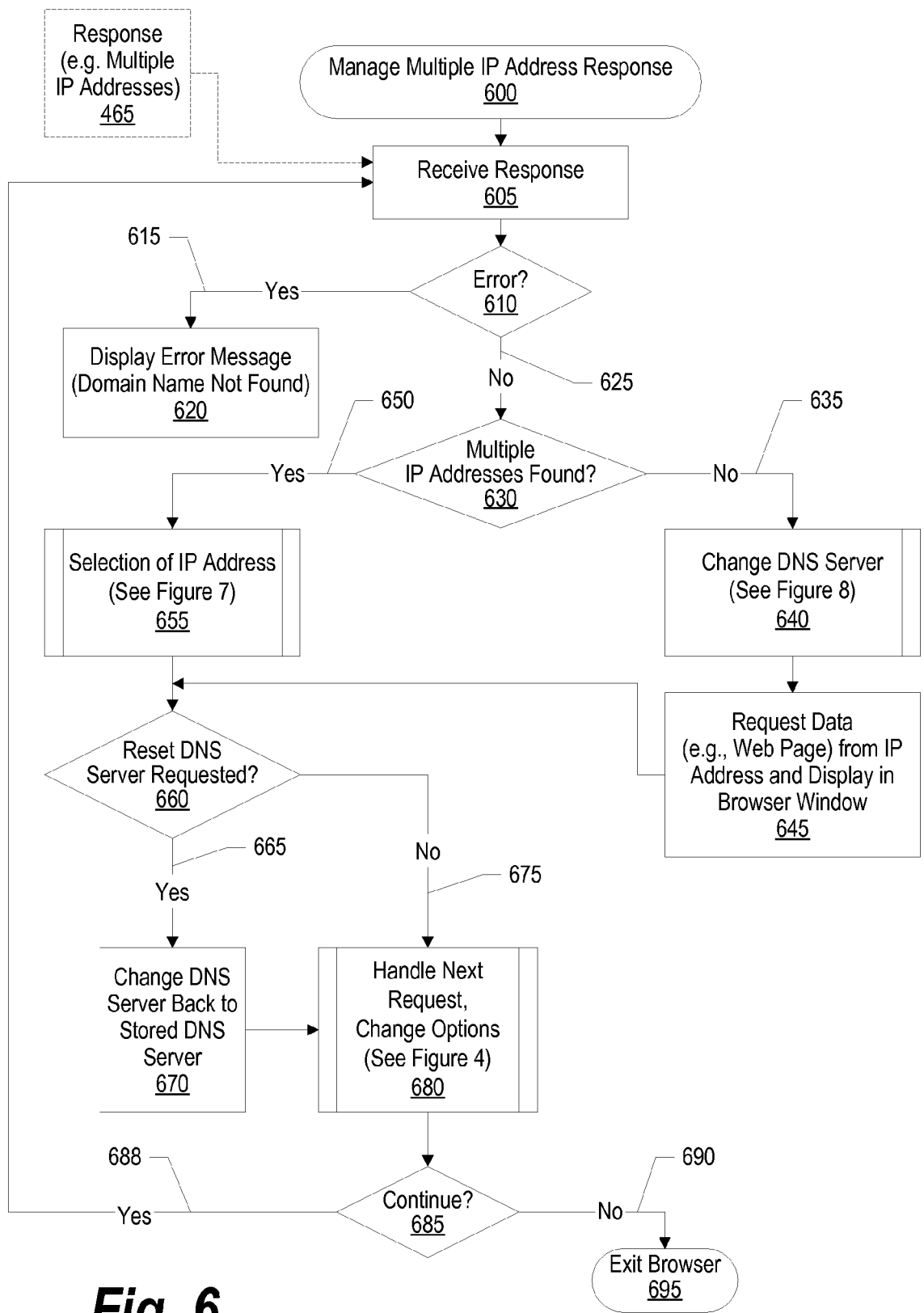
FIG. 6 is an embodiment of a flowchart showing details of the steps taken by the client in FIG. 4 to manage multiple IP addresses returned by the server.

FIG. 6 is a flowchart showing details of the steps taken by the client in FIG. 4 to manage multiple IP addresses returned by the server. FIG. 6 shows the steps performed by predefined process 495 shown in FIG. 4. FIG. 6 processing commences at 600 whereupon, at step 605 response packet 465 which was created and returned by the client's default domain name resolution server is received. A determination is made as to whether the response is an error (decision 610). If the response is an error response, then decision 610 branches to "yes" branch 615 whereupon, at step 620 the error is displayed (e.g., the requested domain name was not found).

On the other hand, if the response is not an error response, then decision 610 branches to "no" branch 625 whereupon another decision is made. Now, a determination is made as to whether multiple IP addresses are included in response packet 465. If multiple IP addresses are not included in response packet 465 (i.e., only a single IP address was included), then decision 630 branches to "no" branch 635 whereupon, at predefined process 640, the client's default DNS server is changed if desired and necessary (see FIG. 8 and corresponding text for processing details involved in changing the default DNS server). At step 645, data is requested from the network resource referenced by the IP address included in response packet 465 (e.g., a web page is requested from a web server referenced by the IP address included in the response packet). Returning to decision 630, if response packet 465 includes multiple IP addresses, then the user selects one of the IP addresses at predefined process 655 and data is requested from the selected IP address, such as a web page from a web server referenced by the selected IP address (see FIG. 7 and corresponding text for processing details).

After data has been retrieved from a network resource referenced by an IP address included in response packet 465, a determination is made as to whether to reset the client's default DNS server (decision 660). If a reset of the client's default DNS server has been requested, then decision 660 branches to "yes" branch 665 whereupon, at step 670, the client's default DNS server is reset back to the DNS server IP address that was stored in FIG. 8 when the clients DNS server was changed. On the other hand, if a reset of the client's DNS server is not requested, then decision 660 branches to "no" branch 675, bypassing step 670.

At predefined process 680 the client's next request is handled and the client can change options that determine how requests are handled (see FIG. 4 and corresponding text for processing details). A determination is made as to whether the client has requested to exit the application or continue retrieving data from network resources (decision 685). If the client is continuing to retrieve data from network resources, then decision 685 branches to "yes" branch 688 which loops back to handle the next response. This looping continues until the user requests to exit the application, at which point decision 685 branches to "no" branch 690 and the application exits at 695.

Figure 7:
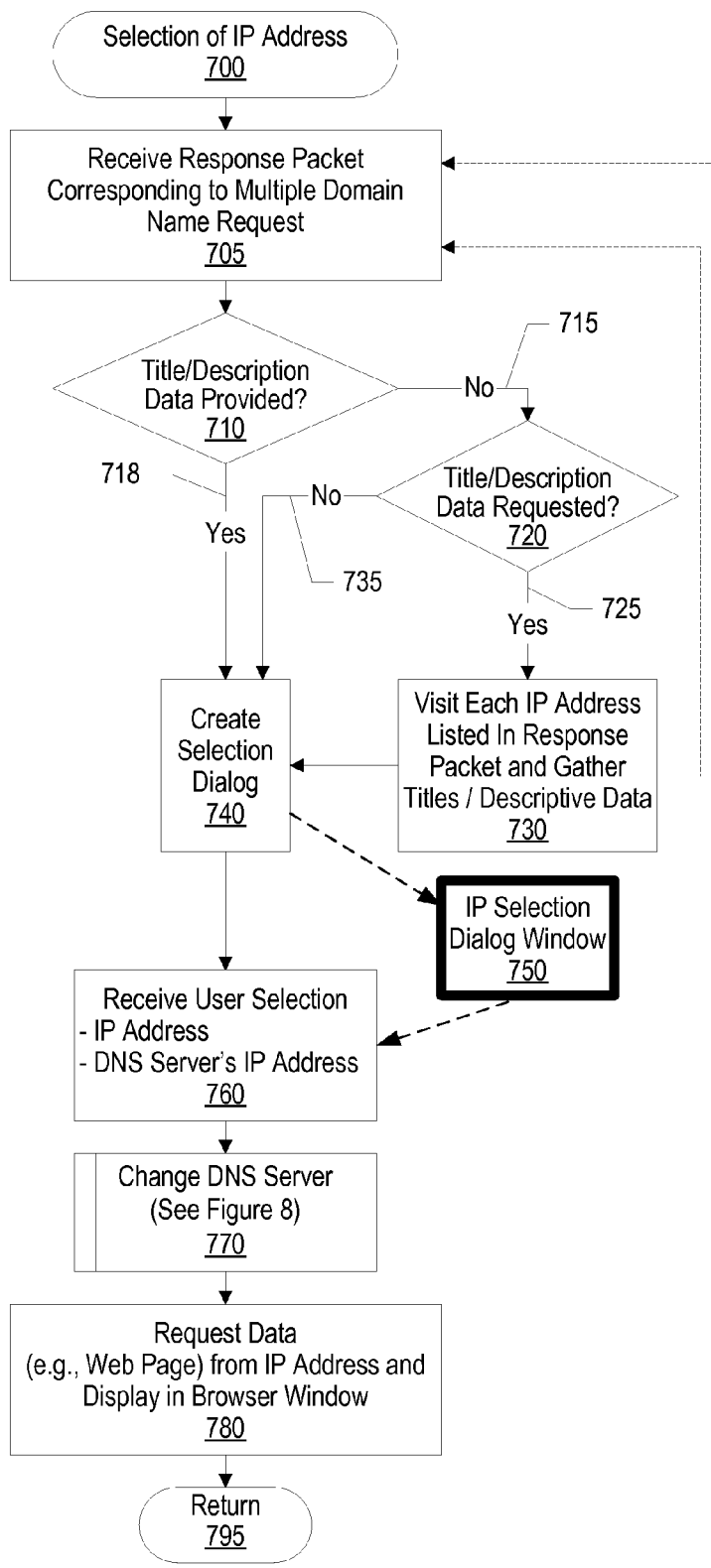
FIG. 7 is an embodiment of a flowchart showing details of the client shown in FIGS. 4 and 6 selecting an IP address from a list of multiple IP addresses returned from the server.

FIG. 7 is a flowchart showing details of the client shown in FIGS. 4 and 6 selecting an IP address from a list of multiple IP addresses returned from the server. Processing used to select an IP address commences at 700 whereupon, at step 705, a responsive packet is received that includes multiple IP addresses. In FIG. 7, responsive packet 465 (shown in FIGS. 4, 5, and 6) has been expanded into two example responsive packets, 701 and 702. The first example responsive packet (701) shows an example where a common domain name is used to reference other IP addresses with dissimilar contents. In the example shown, responsive packet 701 includes IP addresses that reference web sites for "books," "electronics," "shoes," and "clothing." The web sites referenced by these IP addresses might not be run by the same company or organization but, instead, may be set up with regard to an agreement between companies. For example, if the company that provides "books" is a large and well known company, smaller companies that sell electronics, shoes, and clothing may enter into agreements with the large book company to use the same domain name (e.g., "books.com") but have additional IP addresses that reference these other businesses.

Example responsive packet 702 shows another example based more on geographical and legal regulations in various countries. A domain name, such as "xyz.com" may be owned by a single company but, in order to comply with regulations or provide sites that better suit a particular part of the world, separate IP addresses might be used. In the example shown in packet 702, a first IP address for the domain name (e.g., "xyz.com") has one IP address and a domain server that is located in the U.S. However, other IP addresses have been established for the same domain name and reference different web sites (e.g., one directed at a Chinese audience and another directed at a Korean audience). These other IP addresses are referenced in DNS servers that server the other countries (e.g., China and Korea).

Returning to the flowchart, at step 705, the responsive packet that includes multiple IP addresses for the same domain name is received. A determination is made as to whether descriptive text has been provided for each of the IP addresses (decision 710). If descriptive text has not been provided, then decision 710 branches to "no" branch 715 whereupon a determination is made as to whether the user has requested such descriptive text information (decision 720). If the user has requested the descriptive text information, then decision 720 branches to "yes" branch 725 whereupon, at step 730, each of the IP addresses that does not have corresponding descriptive text information is visited and the descriptive text information is gathered from the network resource (e.g., web site) corresponding to the IP address. On the other hand, if descriptive text has not been requested by the user, then decision 720 branches to "no" branch 735 bypassing step 730. Returning to decision 710, if the descriptive text information is included in the responsive packet, then decision 710 branches to "yes" branch 718 bypassing steps 720 and 730.

At step 740, selection dialog window 750 is created. Selection dialog window 750 lists information for each of the IP addresses returned in the responsive packet (e.g., the descriptive text corresponding to each IP address, the IP address itself, the IP address of the DNS server where the IP address was found, etc.).

At step 760, the user's selection from IP selection dialog window 750 is received. The user's selection includes both the IP address of the selection as well as the DNS server's IP address where the selected IP address was found. At predefined process 770, the client's default DNS server is changed if desired and necessary based upon the user's selected options and the particular IP address selected by the user (see FIG. 8 and corresponding text for processing details). At step 780, data is requested from the network resource corresponding to the IP address selected by the user (e.g., a web page is requested from a web server referenced by the selected IP address). Processing then returns to the calling routine (see FIG. 6) at 795.

Figure 8:
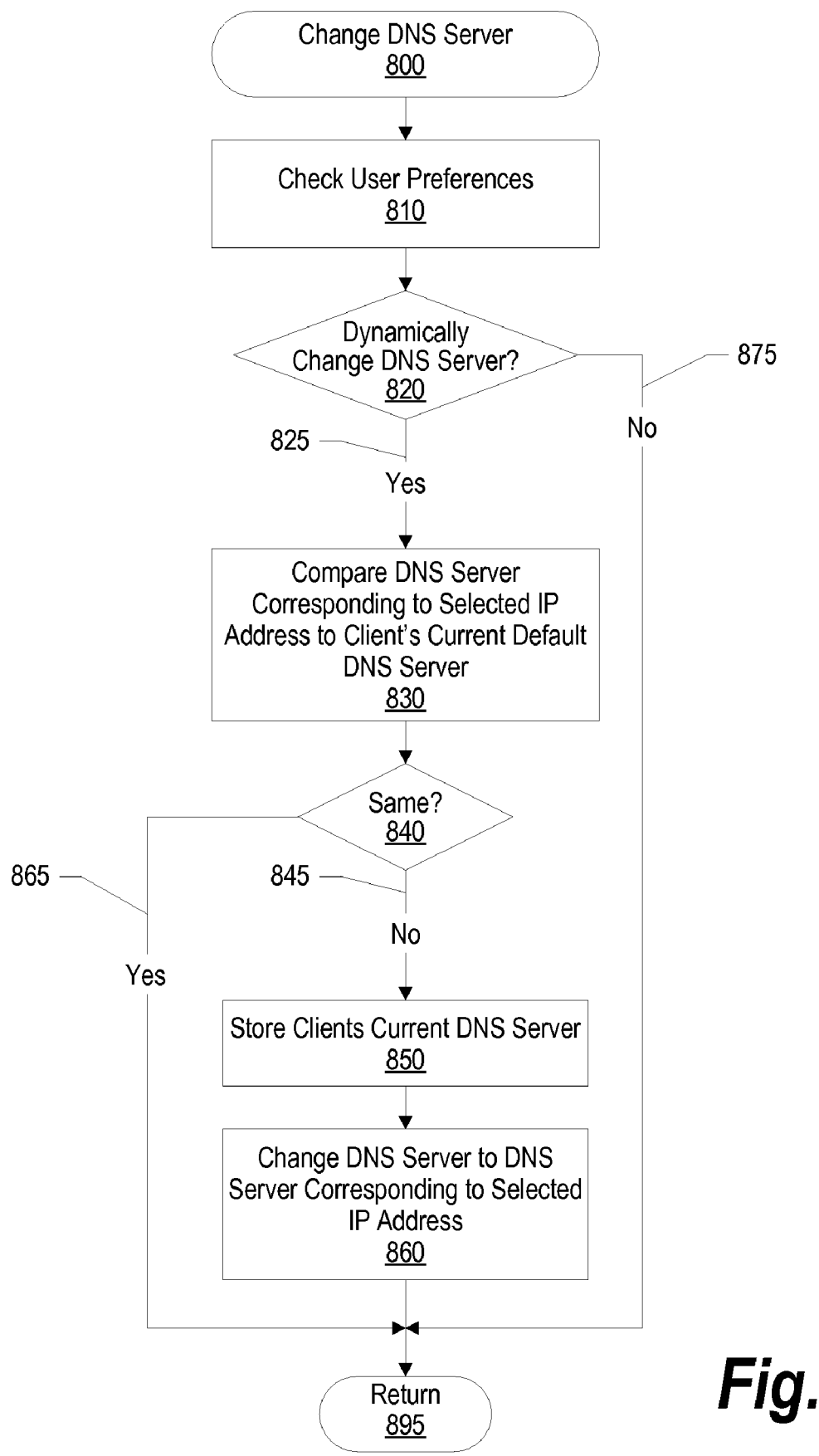
FIG. 8 is an embodiment of a flowchart showing details of the client shown in FIGS. 6 and 7 optionally changing the DNS server used by the client to correspond with the IP address returned by the server and selected by the client.

FIG. 8 is a flowchart showing details of the client shown in FIGS. 6 and 7 optionally changing the DNS server used by the client to correspond with the IP address returned by the server and selected by the client. Processing commences at 800 whereupon, at step 810, the user's preferences stored at the client computer system are retrieved. A determination is made as to whether the user has requested to dynamically change the user's default DNS server (decision 820). If the user has requested dynamically changing the default DNS server, then decision 820 branches to "yes" branch 825 whereupon, at step 830, the DNS server corresponding to the selected IP address (either a single IP address returned as a result of a multiple IP address request or an IP address selected by the user from a list of multiple IP addresses corresponding to the requested domain name) is compared to the client's current default DNS server.

A determination is made as to whether the DNS servers are the same server (decision 840). If the servers are not the same, then decision 840 branches to "no" branch 845 whereupon, at step 850, the client's current default DNS server IP address is stored and, at step 860, the client's default DNS server IP address is changed to the DNS server IP address that corresponds with the IP address either in the response or selected by the user. Returning to decision 840, if the client's current default DNS server is the same as the DNS server corresponding to the selected IP address, then decision 840 branches to "yes" branch 865 bypassing steps 850 and 860. Returning to decision 820, if the client has requested that the client's default DNS not be dynamically changed, then decision 820 branches to "no" branch 875 bypassing step 830 through 860. Processing returns to the calling routine (either FIG. 6 or 7) at return 895.

Figure 9:
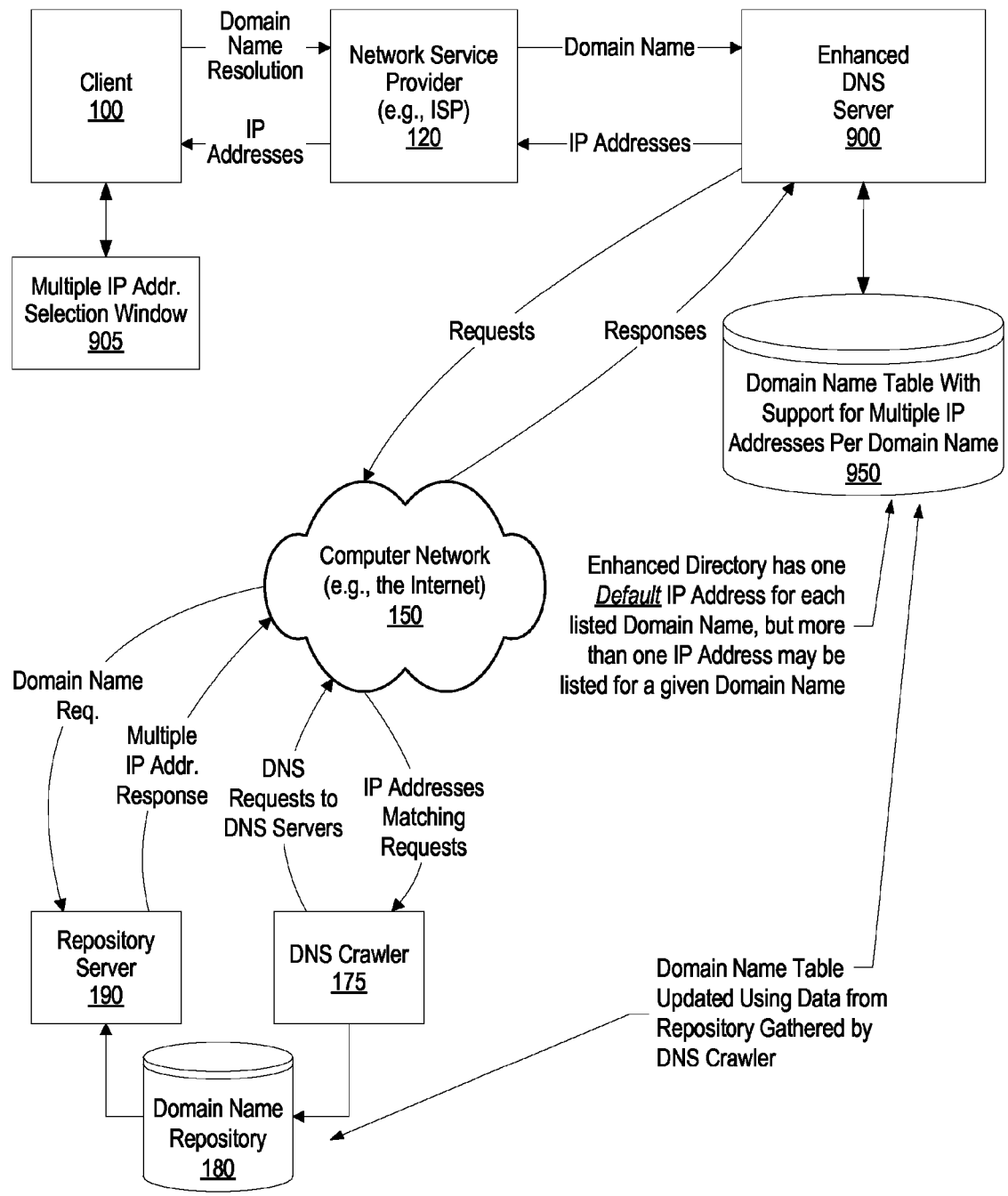
FIG. 9 is an embodiment of a system diagram showing an alternate embodiment using an enhanced DNS server that maintains a DNS table with multiple IP addresses.

FIG. 9 is a system diagram showing an alternate embodiment using an enhanced DNS server that maintains a DNS table with multiple IP addresses. The components shown in FIG. 9 are substantially similar to those shown in FIG. 1 with a few exceptions. Unlike the DNS server shown in FIG. 1 DNS server 900 shown in FIG. 9 is an enhanced DNS server that supports handling multiple IP addresses that each corresponds to a single domain name. Consequently, domain name directory (table) 950 is enhanced over the directory managed by the domain name servers shown in FIG. 1. One enhancement to domain name table 950 is that it can store multiple IP addresses for a given domain name, unlike traditional domain name directories. Another enhancement to domain name table 950 is that one of the entries (IP addresses) for each domain name is noted as being the default entry (IP address). If a user is requesting a single IP address for a domain name, enhanced domain name server 900 returns the default IP address corresponding to the IP address.

As shown in FIG. 9, in one embodiment, enhanced domain name table 950 is updated by using Domain Name Repository 180. Domain Name Repository 180 is generated using DNS Crawler 175 and the steps shown in FIGS. 2 and 3. Another difference between the system diagram shown in FIG. 1 and the system diagram shown in FIG. 9 is that the resulting multiple IP address selection window in FIG. 9 (window 905), includes an indicator regarding which IP address is the default IP address stored in the clients default DNS server. Likewise, the other business units can have separate domain names that reference back to the default books.com web site (IP address "A"). For example, "gizmo.com" is shown as being the domain name with the default IP address that references the electronics IP address (IP address "B"). However, this site also references the IP address that provides book information (IP address "B"). So, if a user requested multiple IP addresses corresponding to "gizmo.com," a multiple IP address dialog would be displayed noting that IP address "B" is the default IP address and is where "electronics" are sold, but IP address "A" would also be shown and the descriptive text would indicate that this is the site where the user can purchase books. The last two domain names (shoes.com and clothing.com) are shown cross referencing each other.

Figure 10:
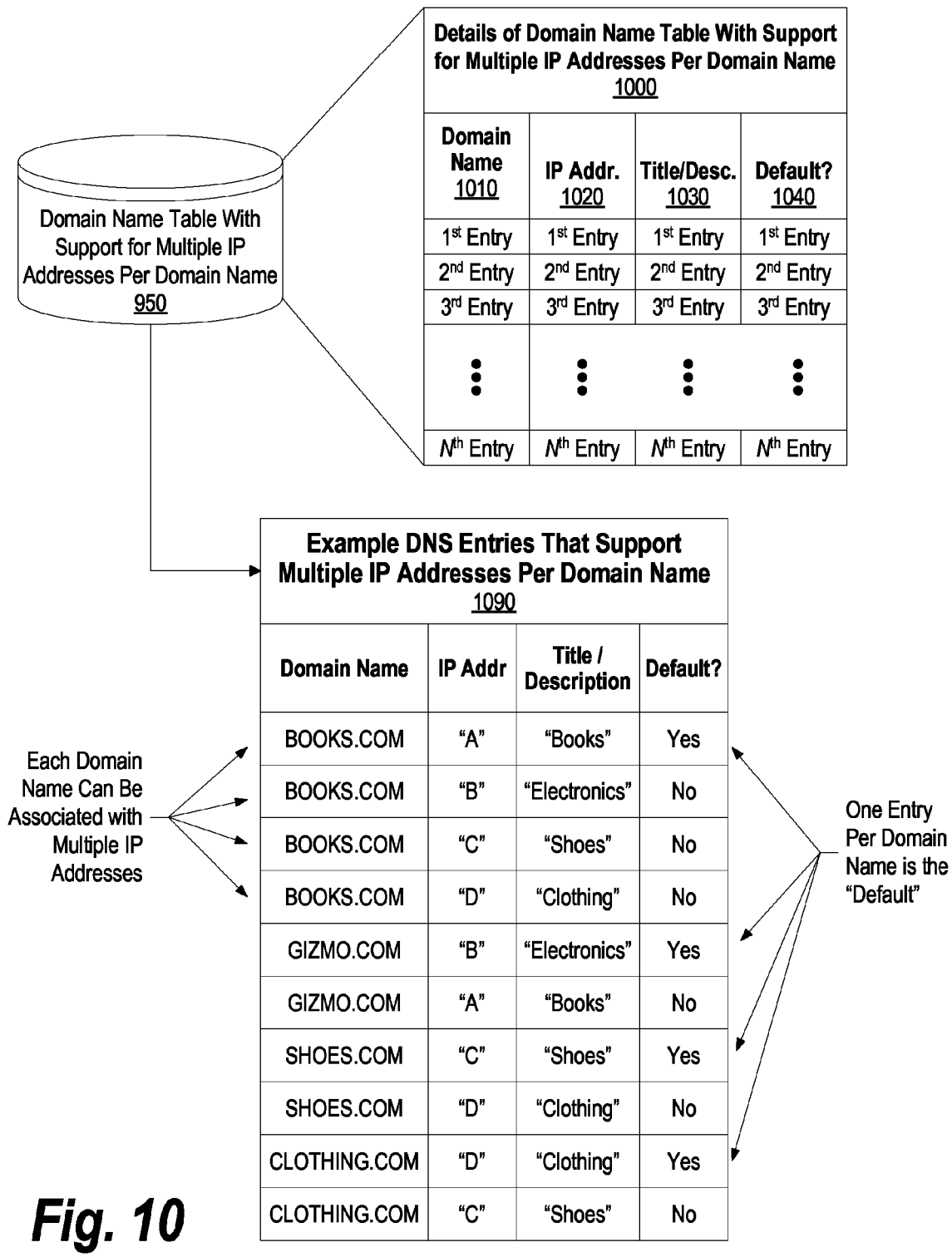
FIG. 10 is an embodiment of a diagram showing details of the enhanced DNS table with multiple IP addresses per domain name.

FIG. 10 is a diagram showing details of the enhanced DNS table with multiple IP addresses per domain name. Details of enhanced DNS table 950 are shown in table 1000. Fields included in the enhanced DNS table include domain name field 1010, IP address field 1020, descriptive text field 1030, and Boolean default field 1040. Using these fields, a given domain can have many IP addresses with one of the IP addresses being noted as the default IP address.

Example DNS table 1090 lists an example of how the entries in the enhanced DNS table can be used to reference multiple IP addresses from individual domain names. In the example, the domain name "books.com" is referenced by four different IP addresses, symbolically noted as IP addresses "A" though "D". However, the descriptive text for each IP address notes that only one of these IP addresses (reference "A") references a network resource that provides "books" and this reference is noted as the Default IP address for the books.com domain name. The other references reference network resources of business units or business partners. In the example shown, the "B" reference is directed to "electronics," while the "C" reference is directed to "shoes," and the "D" reference is directed to "clothing." If a user requested multiple IP addresses for books.com, a display would be generated listing information regarding IP addresses "A" though "D" and noting that the "A" reference is the default IP address. In this manner, if the books.com domain name is trusted by various consumers that are shopping for unrelated items, such as electronics or shoes, then retrieving the multiple IP addresses corresponding to books.com would allow the user to directly select and navigate to one of the other web sites without having to know the other web site's name and without having to navigate through the books.com (e.g., using a "links" area on the books.com site) to find an affiliated company that provides the desired goods.

Figure 11:
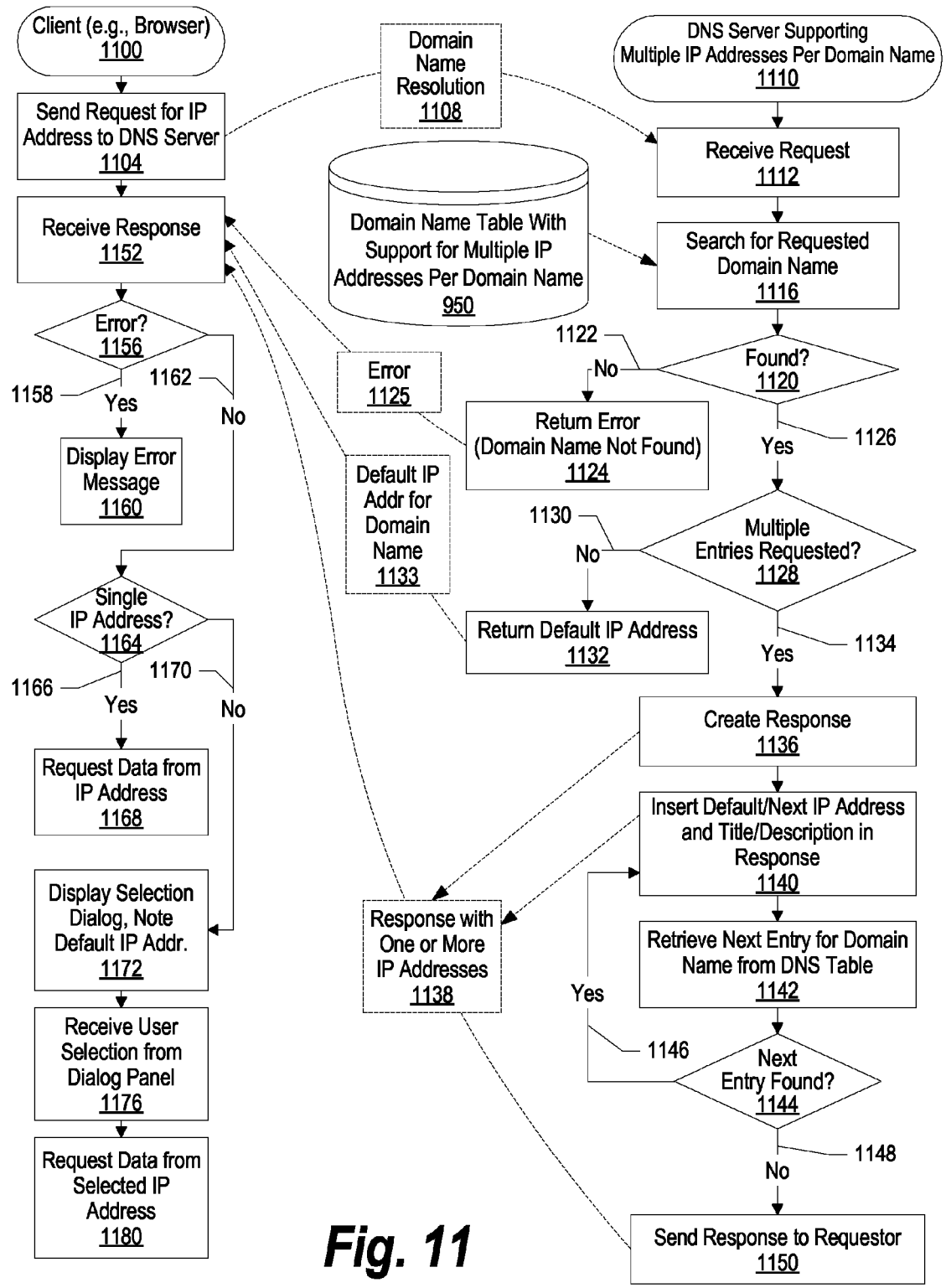
FIG. 11 is an embodiment of a flowchart showing steps taken by a client and the enhanced DNS server for providing multiple IP addresses that correspond to a domain name requested by the client.

FIG. 11 is a flowchart showing steps taken by a client and the enhanced DNS server for providing multiple IP addresses that correspond to a domain name requested by the client. Client processing commences at 1100 whereupon, at step 1104 the client sends a domain name resolution request 1108 to the client's default DNS server that supports multiple IP addresses per domain name. The request identifies the domain name as well as whether the user wishes to receive multiple IP addresses for the domain name.

DNS server processing commences at 1110 whereupon, at step 1112, the server receives domain name resolution request 1108 sent by the client. At step 1116, the server searches for the requested domain name in domain name table 950. A determination is made, based on the search, as to whether the requested domain name was found in the domain name table (decision 1120). If the requested domain name was not found in the domain name table, then decision 1120 branches to "no" branch 1122 whereupon, at step 1124 error packet 1125 is returned to the client indicating that no IP addresses were found for the requested domain name. On the other hand, if at least one IP address was found for the domain name, then decision 1120 branches to "yes" branch 1126.

A determination is made as to whether the user requested multiple IP addresses for the domain name (decision 1128). If the user did not request multiple IP addresses for the domain name, then decision 1128 branches to "no" branch 1130 whereupon, at step 1132, the default IP address corresponding to the domain name is returned to the client in packet 1133.

On the other hand, if the user requested multiple IP addresses for the given domain name, then decision 1128 branches to "yes" branch 1134 whereupon, at step 1136, response 1138 is created that will hold information regarding one or more IP addresses that each reference the same domain name. At step 1140, the first IP address is inserted in response 1138 along with descriptive text corresponding to the IP address and an indicator as to whether the IP address is the default IP address for the domain name. At step 1142, domain name table 950 is searched for another entry referencing the requested domain name. A determination is made as to whether the next entry was found in the domain table (decision 1144). If the next entry was found, decision 1144 branches to "yes" branch 1146 which loops back to insert the newly found reference in response 1138 and look for the next reference to the domain name. This looping continues until no more entries are found that reference the requested domain name, at which time decision 1144 branches to "no" branch 1148 whereupon, at step 1150, response 1138 is returned to the client computer system.

Returning to client processing, the client computer system receives the response from the DNS server at step 1152. A determination is made as to whether the response is an error (decision 1156). If the response is an error, then decision 1156 branches to "yes" branch 1158 whereupon, at step 1160 an error message is displayed (e.g., indicating that the requested domain name was not found) and processing ends.

On the other hand, if the response is not an error, then decision 1156 branches to "no" branch 1162 whereupon a determination is made as to whether the response includes a single IP address (decision 1164). If the response only includes a single IP address, then decision 1164 branches to "yes" branch 1166 whereupon, at step 1168, data is requested from the network resource (e.g., a web site) that corresponds to the single IP address.

On the other hand, if the response includes multiple IP addresses, then decision 1164 branches to "no" branch 1170 whereupon, at step 1172 a selection dialog window is displayed. This dialog window includes any descriptive text information corresponding to each of the IP addresses included in response 1138 along with an indicator showing which selection is the default selection. At step 1176, the user selects one of the selections from the dialog window, and at step 1180 data is requested from the network resource (e.g., a web site) that corresponds to the IP address selected by the user.

Figure 12:
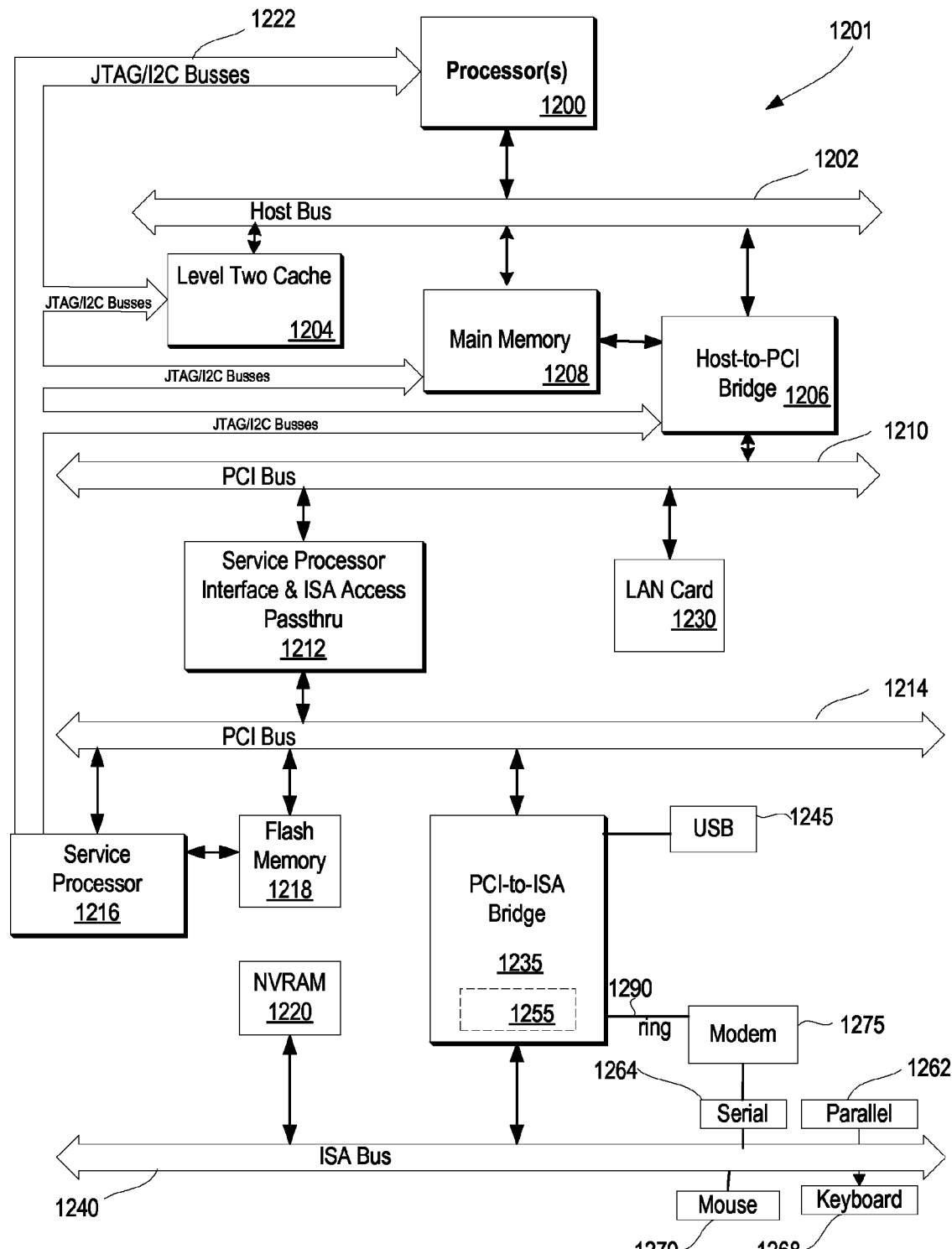
FIG. 12 is an embodiment of a block diagram of a data processing system in which the methods described herein can be implemented.

FIG. 12 illustrates information handling system 1201 which is a simplified example of a computer system capable of performing the computing operations described herein. Computer system 1201 includes processor 1200 which is coupled to host bus 1202. A level two (L2) cache memory 1204 is also coupled to host bus 1202. Host-to-PC bridge 1206 is coupled to main memory 1208, includes cache memory and main memory control functions, and provides bus control to handle transfers among PCI bus 1210, processor 1200, L2 cache 1204, main memory 1208, and host bus 1202. Main memory 1208 is coupled to Host-to-PCI bridge 1206 as well as host bus 1202. Devices used solely by host processor(s) 1200, such as LAN card 1230, are coupled to PCI bus 1210. Service Processor Interface and ISA Access Pass-through 1212 provide an interface between PCI bus 1210 and PCI bus 1214. In this manner, PCI bus 1214 is insulated from PCI bus 1210. Devices, such as flash memory 1218, are coupled to PCI bus 1214. In one implementation, flash memory 1218 includes BIOS code that incorporates the necessary processor executable code for a variety of low-level system functions and system boot functions.

PCI bus 1214 provides an interface for a variety of devices that are shared by host processor(s) 1200 and Service Processor 1216 including, for example, flash memory 1218. PCI-to-ISA bridge 1235 provides bus control to handle transfers between PCI bus 1214 and ISA bus 1240, universal serial bus (USB) functionality 1245, power management functionality 1255, and can include other functional elements not shown, such as a real-time clock (RTC), DMA control, interrupt support, and system management bus support. Nonvolatile RAM 1220 is attached to ISA Bus 1240. Service Processor 1216 includes JTAG and I2C busses 1222 for communication with processor(s) 1200 during initialization steps. JTAG/I2C busses 1222 are also coupled to L2 cache 1204, Host-to-PCI bridge 1206, and main memory 1208 providing a communications path between the processor, the Service Processor, the L2 cache, the Host-to-PCI bridge, and the main memory. Service Processor 1216 also has access to system power resources for powering down information handling device 1201.

Peripheral devices and input/output (I/O) devices can be attached to various interfaces (e.g., parallel interface 1262, serial interface 1264, keyboard interface 1268, and mouse interface 1270 coupled to ISA bus 1240. Alternatively, many I/O devices can be accommodated by a super I/O controller (not shown) attached to ISA bus 1240.

In order to attach computer system 1201 to another computer system to copy files over a network, LAN card 1230 is coupled to PCI bus 1210. Similarly, to connect computer system 1201 to an ISP to connect to the Internet using a telephone line connection, modem 1275 is connected to serial port 1264 and PCI-to-ISA Bridge 1235.

While FIG. 12 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

One of the preferred implementations of the invention is a software application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method of accessing a network resource, said method comprising:
    sending, from a client computer system, a first domain name resolution request to a Domain Name System (DNS) server, wherein the first domain name resolution request includes a first domain name and requests multiple IP addresses;
    receiving, from the DNS server, a first multiple IP address response that corresponds to the first domain name resolution request, the first multiple IP address response including a plurality of IP addresses that each correspond to the first domain name included in the first domain name resolution request;
    selecting, at the client computer system, one of the plurality of IP addresses;
    sending, from the client computer system, a request to a server corresponding to the selected IP address;
    receiving responsive data from the server and displaying the responsive data on a display screen accessible from the client computer system;
    sending, from the client computer system, a second domain name resolution request to the DNS server, the second domain name resolution request requesting multiple IP addresses and including a second domain name;
    receiving, from the DNS server, a second multiple IP address response that corresponds to the second domain name resolution request, the second multiple IP address response including a single IP address that corresponds to the second domain name included in the second domain name resolution request; and
    automatically requesting data from a second server that corresponds to the single IP address in response to receiving the single IP address at the client computer system.

2. The method of claim 1 wherein the plurality of IP addresses included in the first multiple IP address response includes one default IP address.

3. The method of claim 2 further comprising:
    sending, from the client computer system, a third domain name resolution request to the DNS server, the third domain name resolution request requesting a single IP address and including a third domain name;
    receiving, from the DNS server, a third default IP address that corresponds to the third domain name; and
    automatically requesting data from a third server that corresponds to the third default IP address in response to receiving the third default IP address at the client computer system.

4. The method of claim 1 wherein the first multiple IP address response includes a plurality of descriptive texts corresponding to a plurality of the IP addresses included in the first multiple IP address response, the method further comprising:
    prior to the selecting, displaying the plurality of descriptive texts corresponding to the plurality of IP addresses, wherein the selection is based upon the displayed descriptive texts.

5. The method of claim 4 further comprising:
    identifying one or more IP addresses included in the first multiple IP address response that do not have corresponding descriptive texts;
    prior to the displaying:
        accessing each network resource that corresponds with each of the IP addresses that does not have corresponding descriptive texts;
        gathering a descriptive text for each of the accessed network resource; and
        including the gathered descriptive texts in the plurality of displayed descriptive texts.

6. The method of claim 1 wherein the DNS server receives the multiple IP addresses corresponding to the first domain name from a domain name repository, wherein the DNS server and the domain name repository are interconnected using a computer network, the method further comprising:
    receiving, at the DNS server, the plurality of IP addresses from one or more network accessible sources, wherein one of the sources is a result of a DNS crawler application.

7. A information handling system comprising:
    one or more processors;
    a memory accessible by at least one of the processors;
    a nonvolatile storage area accessible by at least one of the processors;
    a network interface adapter connecting the information handling system to a computer network;
    a display screen accessible from the at least one of the processors; and
    a set of instructions stored in the memory, wherein one or more of the processors executes the set of instructions in order to perform actions of:
        sending, from the information handling system, a first domain name resolution request to a Domain Name System (DNS) server, wherein the first domain name resolution request includes a first domain name and requests multiple IP addresses;
        receiving, from the DNS server, a first multiple IP address response that corresponds to the first domain name resolution request, the first multiple IP address response including a plurality of IP addresses that each correspond to the first domain name included in the first domain name resolution request, wherein the plurality of IP addresses included in the IP address response includes a first default IP address;
        selecting one of the plurality of IP addresses;
        sending a request to a server corresponding to the selected IP address;
        receiving responsive data from the server and displaying the responsive data on the display screen;
        sending a second domain name resolution request to the DNS server, the second domain name resolution request requesting a single IP address and including a second domain name;
        receiving, from the DNS server, a second default IP address that corresponds to the second domain name; and automatically requesting data from a second server that corresponds to the second IP address in response to receiving the second default IP address at the information handling system.

8. The information handling system of claim 7 wherein the set of instructions perform further actions comprising:
sending a third domain name resolution request to the DNS server, the third domain name resolution request requesting multiple IP addresses and including a third domain name;
receiving, from the DNS server, a third multiple IP address response that corresponds to the third domain name resolution request, the third multiple IP address response including a single IP address that corresponds to the third domain name included in the third domain name resolution request; and
automatically requesting data from a third server that corresponds to the single IP address in response to receiving the single IP address at the client computer system.

9. The information handling system of claim 7 wherein the first multiple IP address response includes a plurality of descriptive texts corresponding to a plurality of the first multiple IP addresses included in the first multiple IP address response, wherein the set of instructions perform further actions comprising:
prior to the selecting, displaying the plurality of descriptive texts corresponding to the plurality of IP addresses, wherein the selection is based upon the displayed descriptive texts.

10. The information handling system of claim 9 wherein the set of instructions perform further actions comprising:
identifying one or more IP addresses included in the first multiple IP address response that do not have corresponding descriptive texts;
prior to the displaying:
accessing each network resource that corresponds with each of the IP addresses that does not have corresponding descriptive texts;
gathering a descriptive text for each of the accessed network resource; and
including the gathered descriptive texts in the plurality of displayed descriptive texts.

11. The information handling system of claim 7 wherein the DNS server receives the multiple IP addresses corresponding to the first domain name from a domain name repository, wherein the DNS server and the domain name repository are interconnected using the computer network, wherein the plurality of IP addresses are received from one or more network accessible sources, wherein one of the sources is a result of a DNS crawler application.

12. A computer program product stored in a computer storage medium, comprising functional descriptive material that, when executed by an information handling system, causes the information handling system to access a network resource by performing actions that include:
sending, from a client computer system, a first domain name resolution request to a Domain Name System (DNS) server, wherein the first domain name resolution request includes a first domain name and requests multiple IP addresses;
receiving, from the DNS server, a first multiple IP address response that corresponds to the first domain name resolution request, the first multiple IP address response including a plurality of IP addresses that each correspond to the first domain name included in the first domain name resolution request;
selecting, at the client computer system, one of the plurality of IP addresses;
sending, from the client computer system, a request to a server corresponding to the selected IP address;
receiving responsive data from the server and displaying the responsive data on a display screen accessible from the client computer system;
sending, from the client computer system, a second domain name resolution request to the DNS server, the second domain name resolution request requesting multiple IP addresses and including a second domain name;
receiving, from the DNS server, a second multiple IP address response that corresponds to the second domain name resolution request, the second multiple IP address response including a single IP address that corresponds to the second domain name included in the second domain name resolution request; and
automatically requesting data from a second server that corresponds to the single IP address in response to receiving the single IP address at the client computer system.

13. The computer program product of claim 12 wherein the plurality of IP addresses included in the first multiple IP address response includes one default IP address.

14. The computer program product of claim 13 wherein the functional descriptive material causes the information handling system to perform further actions comprising:
sending, from the client computer system, a third domain name resolution request to the DNS server, the third domain name resolution request requesting a single IP address and including a third domain name;
receiving, from the DNS server, a third default IP address that corresponds to the third domain name; and
automatically requesting data from a third server that corresponds to the third default IP address in response to receiving the third default IP address at the client computer system.

15. The computer program product of claim 12 wherein the first multiple IP address response includes a plurality of descriptive texts corresponding to a plurality of the IP addresses included in the first multiple IP address response, the functional descriptive material causing the information handling system to perform further actions comprising:
prior to the selecting, displaying the plurality of descriptive texts corresponding to the plurality of IP addresses, wherein the selection is based upon the displayed descriptive texts.

16. The computer program product of claim 15 wherein the functional descriptive material causes the information handling system to perform further actions comprising:
identifying one or more IP addresses included in the first multiple IP address response that do not have corresponding descriptive texts;
prior to the displaying:
accessing each network resource that corresponds with each of the IP addresses that does not have corresponding descriptive texts;
gathering a descriptive text for each of the accessed network resource; and
including the gathered descriptive texts in the plurality of displayed descriptive texts.

17. The computer program product of claim 12 wherein the DNS server receives the multiple IP addresses corresponding to the first domain name from a domain name repository, wherein the DNS server and the domain name repository are interconnected using a computer network, the functional descriptive material causes the information handling system to perform further actions comprising:

receiving, at the DNS server, the plurality of IP addresses from one or more network accessible sources, wherein one of the sources is a result of a DNS crawler application.

18. A computer-implemented method of accessing a network resource, said method comprising:

sending, from a client computer system, a first domain name resolution request to a Domain Name System (DNS) server, wherein the first domain name resolution request includes a first domain name and requests multiple IP addresses;

receiving, from the DNS server, a first multiple IP address response that corresponds to the first domain name resolution request, the first multiple IP address response including a plurality of IP addresses that each correspond to the first domain name included in the first domain name resolution request;

selecting, at the client computer system, one of the plurality of IP addresses;

sending, from the client computer system, a request to a server corresponding to the selected IP address;

receiving responsive data from the server and displaying the responsive data on a display screen accessible from the client computer system;

sending, from the client computer system, a second domain name resolution request to the DNS server, the second domain name resolution request requesting a single IP address and including a second domain name;

receiving, from the DNS server, a second default IP address that corresponds to the second domain name; and automatically requesting data from a second server that corresponds to the second default IP address in response to receiving the second default IP address at the client computer system.

19. The method of claim 18 wherein the first multiple IP address response includes a plurality of descriptive texts corresponding to a plurality of the IP addresses included in the first multiple IP address response, the method further comprising:

prior to the selecting, displaying the plurality of descriptive texts corresponding to the plurality of IP addresses, wherein the selection is based upon the displayed descriptive texts.

20. The method of claim 19 further comprising:

identifying one or more IP addresses included in the first multiple IP address response that do not have corresponding descriptive texts;

prior to the displaying:

accessing each network resource that corresponds with each of the IP addresses that does not have corresponding descriptive texts;

gathering a descriptive text for each of the accessed network resource; and including the gathered descriptive texts in the plurality of displayed descriptive texts.

21. The method of claim 18 wherein the DNS server receives the multiple IP addresses corresponding to the first domain name from a domain name repository, wherein the DNS server and the domain name repository are interconnected using a computer network, the method further comprising:

receiving, at the DNS server, the plurality of IP addresses from one or more network accessible sources, wherein one of the sources is a result of a DNS crawler application.

* * * * *